(12) United States Patent
Balenovic et al.

(10) Patent No.: US 8,635,007 B2
(45) Date of Patent: Jan. 21, 2014

(54) FILTERING METHOD AND FILTER FOR A NOX SENSOR OF AN EXHAUST GAS SYSTEM

(75) Inventors: Mario Balenovic, Waalre (NL); Yasser Mohamed Sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 13/471,244

(22) Filed: May 14, 2012

(65) Prior Publication Data

US 2012/0311996 A1 Dec. 13, 2012

(30) Foreign Application Priority Data

Jun. 9, 2011 (DE) .......................... 10 2011 077 246

(51) Int. Cl.
*G06F 19/00* (2011.01)
*F02D 41/14* (2006.01)
*F01N 3/18* (2006.01)
*G06F 11/30* (2006.01)

(52) U.S. Cl.
USPC .......... 701/114; 701/102; 60/276; 73/114.71; 702/185

(58) Field of Classification Search
USPC .......... 123/672, 703; 701/102, 103, 109, 114; 60/274, 276; 73/23.31, 23.32, 114.71, 73/114.72, 114.75; 702/182, 183, 185; 436/113, 116–118
See application file for complete search history.

(56) References Cited

U.S. PATENT DOCUMENTS

| 7,736,595 B2 * | 6/2010 | Gady et al. ................... 422/105 |
| 8,387,368 B2 * | 3/2013 | Parmentier et al. ............ 60/286 |
| 2008/0274559 A1 * | 11/2008 | Fleischer et al. .............. 436/113 |
| 2010/0242454 A1 * | 9/2010 | Holderbaum ................... 60/301 |
| 2012/0310507 A1 * | 12/2012 | Auckenthaler ............... 701/102 |

FOREIGN PATENT DOCUMENTS

| DE | 102010026373 A1 | 3/2011 | |
| JP | 2007051924 A * | 3/2007 | ................... 701/109 |

* cited by examiner

*Primary Examiner* — Willis R Wolfe, Jr.
(74) *Attorney, Agent, or Firm* — Julia Voutyras; Alleman Hall McCoy Russell & Tuttle LLP

(57) ABSTRACT

Embodiments for determining $NH_3$ slip past a catalyst are provided. In one example, a filtering method for a NOx sensor of an exhaust gas system having an SCR catalytic converter comprises determining NOx concentration upstream of the catalytic converter, measuring NOx concentration downstream of the catalytic converter, modeling NOx conversion, modeling $NH_3$ slip behavior, calculating a NOx error of the NOx modeling, calculating an $NH_3$ error of the $NH_3$ modeling, assigning data of the NOx sensor as $NH_3$ measured values when a ratio of the NOx error to the $NH_3$ error is greater than an upper threshold value, and assigning data of the NOx sensor as NOx measured values when the ratio of the NOx error to the $NH_3$ error is smaller than a lower threshold value. In this way, NOx slip and $NH_3$ slip may be determined from a common sensor.

10 Claims, 4 Drawing Sheets

FILTERING METHOD AND FILTER FOR A NOX SENSOR OF AN EXHAUST GAS SYSTEM

RELATED APPLICATIONS

The present application claims priority to German Patent Application Number 102011077246.4, filed on Jun. 9, 2011, the entire contents of which are hereby incorporated by reference for all purposes.

FIELD

The disclosure relates to a filtering method and a filter for a NOx sensor of an exhaust gas system, in particular of an exhaust gas system with an SCR catalytic converter for an internal combustion engine of a motor vehicle.

BACKGROUND AND SUMMARY

Systems with an SCR catalytic converter (selective catalytic reduction) are well suited for removing NOx emissions, specifically in the case of exhaust gases of diesel engines. In the case of an active SCR system, ammonia ($NH_3$) is dosed in the SCR catalytic converter where it is adsorbed on the catalytic converter and reacts with NO and $NO_2$ from the exhaust gas. $NH_3$ is typically dosed not directly but mostly in the form of a urea solution that is partially converted into $NH_3$ after the injection. In the case of a passive SCR system, there is no active injection of $NH_3$ or urea upstream of the catalytic converter. Instead of this, $NH_3$ is produced by another component upstream of the catalytic converter, such as for example a LNT (lean NOx trap), once the engine is operating in the rich mode.

If not enough $NH_3$ is being dosed or stored in the catalytic converter, or if the temperature is unsuitable for complete NOx conversion, not all the NOx is converted, and there will be a NOx slip through the catalytic converter. If, however, too much $NH_3$ has been dosed and stored in the catalytic converter, a desorption can occur. An $NH_3$ desorption usually occurs after a rapid temperature rise, for example, as a consequence of a rising engine load. However, it can also occur given overdosing of $NH_3$ at a constant temperature.

Information relating to the concentration of NOx and $NH_3$ downstream or behind the catalytic converter is of interest for the purpose of accurately monitoring the processes in the SCR catalytic converter. There are two types of sensors, $NH_3$ sensors and NOx sensors, for this purpose. Whereas $NH_3$ sensors measure only $NH_3$ concentrations or quantities, NOx sensors are sensitive both to NOx and to $NH_3$. This leads to difficulties in measurement inasmuch as it can be difficult to establish whether the sensor is measuring just NOx values or $NH_3$ values.

Thus, in one embodiment, a filtering method for a NOx sensor of an exhaust gas system having an SCR catalytic converter comprises determining NOx concentration upstream of the catalytic converter, measuring NOx concentration downstream of the catalytic converter, modeling NOx conversion, modeling $NH_3$ slip behavior, calculating a NOx error of the NOx modeling, calculating an $NH_3$ error of the $NH_3$ modeling, assigning data of the NOx sensor as $NH_3$ measured values when a ratio of the NOx error to the $NH_3$ error is greater than an upper threshold value, and assigning data of the NOx sensor as NOx measured values when the ratio of the NOx error to the $NH_3$ error is smaller than a lower threshold value.

With the aid of this filtering method, it is possible, for example, to establish or fix, for subsequent data processing by a controller of the exhaust gas system, whether the signal measured by the NOx sensor is a NOx measured value or an $NH_3$ measured value. Two different models are created and/or adapted continuously. One model describes the NOx conversion in the catalytic converter, and the second model describes the behavior of the $NH_3$ slip through the catalytic converter. The actual $NH_3$ release process is complex and difficult to describe through a simple model, but it is possible, nevertheless, to use the two models described to establish the measurement mode of the NOx sensor without an additional $NH_3$ sensor. Finally, the prediction quality or the error of the two models can be calculated and compared. In the case of a NOx slip, both models typically display similar levels of accuracy, while the accuracy of the NOx model is substantially degraded given an $NH_3$ slip. An $NH_3$ model based on a linear-time algorithm can also predict a NOx signal in a restricted time window.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The NOx concentration upstream of the catalytic converter can be determined with the aid of a sensor. A sensor delivers accurate values of the NOx concentration or amount. A sensor possibly already present can be used.

The NOx concentration upstream of the catalytic converter can be determined with the aid of a model that determines the amount and/or concentration of NOx produced by an engine connected upstream of the exhaust gas system. It is possible to dispense with additional hardware in the case of this model. The model can be implemented in addition, or it is possible to use or modify an already existing model for example of the motor controller or of the exhaust gas aftertreatment.

For the modeling of the NOx conversion a kinetic model of the NOx conversion can be used, which can preferably be a simplified kinetic model, in order to reduce the computational outlay and the later processing of the data.

A linear-time algorithm can be used for the modeling of the NH$_3$ slip behavior. This simple algorithm is sufficient for the description of the NH$_3$ slip via a restricted time window.

The calculations can be executed at sampling instants with a sampling time of one second in one example. Too small a number of sampling instants does not enable a consistent model, while too high a number increases the computational outlay unnecessarily. In addition, the correct selection of the sampling times can, for example, permit the assumption for the NOx model that there is no substantial change either in the NH$_3$ storage level or in the temperature of the catalytic converter during the time window or time frame. Such an assumption can simplify the modeling.

For the calculation of the NOx error and of the NH$_3$ error, use is made, in addition, of values of temporally earlier sampling instants, for example in a time frame of twenty seconds. This raises the reliability of the calculation and the fixing of which measured values are to be measured.

The temperature of the catalytic converter can be taken into account to fix the type of the measured values. This can improve the validity of the method since, for example, an NH$_3$ slip is very unlikely at low temperatures.

Absolute sensor and/or error signals can be taken into account for determining, modeling, calculating and/or fixing. This can be used for the purpose of not permitting decisions to be taken when the operating states or conditions are not suitable. The method thereby becomes more robust and less liable to error.

The filtering may be carried out according to instructions stored in the memory of a controller, for example within a filter unit of the controller. The filter unit may receive signal inputs for signals of the NOx sensor, carry out the above described filtering method in an arithmetic unit of the controller, and output signals for outputting a result of the method. The above described advantages and modifications apply.

Figure 1:
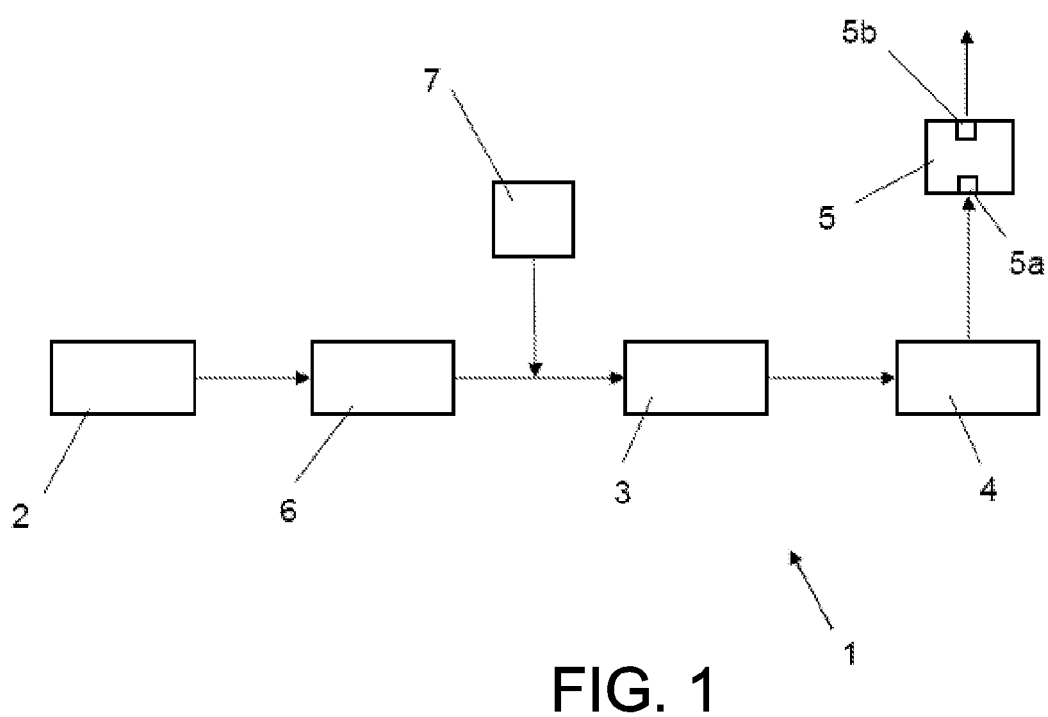
FIG. 1 shows a schematic block diagram of an exhaust gas system with a controller configured to filter a NOx sensor in accordance with the disclosure.

FIG. 1 shows a part of an exhaust gas aftertreatment system 1 for an internal combustion engine 2, for example a diesel engine of a motor vehicle. The exhaust gas aftertreatment system or exhaust gas system 1 comprises a catalytic converter 3, such as for example an SCR (selective catalytic reduction) catalytic converter, arranged downstream of the engine 2.

Arranged downstream of the catalytic converter 3 is a NOx sensor 4 for measuring the NOx concentration or the NOx amount in the exhaust gas. The NOx sensor 4 need not be arranged directly after the catalytic converter 3; it can also be located further downstream.

Measured values of the NOx sensor 4 reach a filter or NH$_3$ filter 5 for the NOx sensor 4. This filter 5 processes the measured values or prepares them so that it can be recognized whether the values measured by the NOx sensor 4 are NOx values or NH$_3$ values. The filter 5 outputs appropriate signals to, for example, an engine controller or a controller of the exhaust gas aftertreatment.

The filter 5 can be an independent unit with a signal input 5a for signals of the NOx sensor 4, an arithmetic unit for carrying out the filtering method, and a signal output 5b for outputting a result of the method. The filter 5 can also be a component of a controller such as, for example, an engine controller or a controller of the exhaust gas aftertreatment. This can be implemented in the form of a software routine or of a software module. The signal output 5b can likewise be implemented in software. The controller may receive input data from the various sensors (such as NOx sensors 4 and 6), process the input data, and trigger actuators (such as fuen injectors, reductant injectors of the SCR system, etc.) in response to the processed input data based on instruction or code programmed therein corresponding to one or more routines. An example control routine is described herein with regard to FIG. 2.

In addition to the measured value delivered by the NOx sensor 4, downstream of the catalytic converter 3, the filter 5 utilizes the NOx concentration or NOx amount that is produced by the engine 2 and leaves the latter in the direction of the catalytic converter 3.

Either there is an additional NOx sensor 6 present upstream of the catalytic converter 3, or the NOx concentration upstream of the catalytic converter 3 is determined with the aid of a model that determines the amount and/or concentration of NOx produced by the engine 2. The model can be supplied, for example, with data from the engine controller and/or the controller of the exhaust gas aftertreatment. The model can be implemented, for example, in one of the two controllers.

Provided between the optional NOx sensor 6 upstream of the catalytic converter 3 and the catalytic converter 3 is a likewise optional injection point 7 for injection of urea solution or NH$_3$ or other reductant. The NOx sensor 6 is arranged upstream of the injection point 7 in order to avoid NH$_3$ cross sensitivity.

With the aid of FIG. 2 the mode of operation of the filter 5 or of the filtering method will now be described. The filtering method proceeds from a NOx sensor 4 after the catalytic converter 3 and from information relating to the NOx entering the catalytic converter 3, obtained by a sensor 6 or a model. The aim of the method is to decide whether the data measured by the NOx sensor 4 are NOx values or NH$_3$ values. To this end, an algorithm examines dynamic differences in the production of the NH$_3$ slip and of the NOx slip after or downstream of the catalytic converter 3.

NOx slip occurs when the catalytic converter 3 cannot convert all the NOx entering the catalytic converter 3. The conversion efficiency is typically a function of the temperature, of the NH$_3$ level stored in the catalytic converter, and of the space velocity (exhaust gas mass flow). The NOx slip is therefore directly associated with the incoming NOx mixture by the equation:

$$NOx\_slip = (1-conv\_eff)*NOx\_preSCR,$$

in which conv_eff is equal to conversion efficiency (which values range from 0-1).

When, on the other hand, NH$_3$ slip occurs, this is not correlated directly with the NOx value upstream of the catalytic converter 3. NH$_3$ adsorption and release (desorption) are usually slow processes that depend for the adsorption mainly on the NH$_3$ dosing rate, the NH$_3$ already stored in the catalytic converter, and the temperature. The NH$_3$ desorption has a substantially weaker correlation with the incoming NOx.

Figure 2:
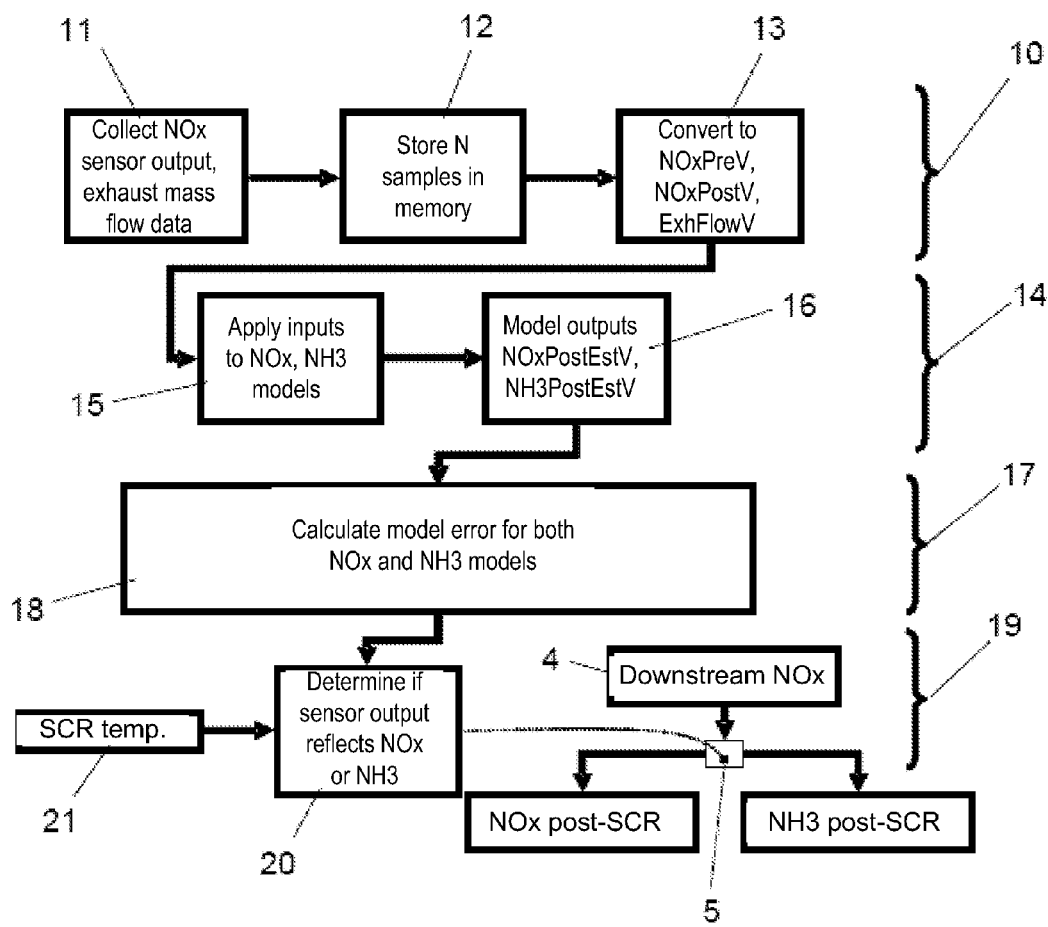
FIG. 2 shows a block diagram of the filtering method for a NOx sensor in accordance with the disclosure.

The process illustrated schematically in FIG. 2 has a first stage 10 of data conditioning or preprocessing. At 11, the NOx values upstream and downstream of the catalytic converter 3 are determined, as well as the exhaust gas mass flow.

AT 12, the last N sampled values are stored in a memory, and at 13 these sampled values are used to produce vectors of the NOx values upstream and downstream of the exhaust gas mass flow. The samples may be collected once every second for twenty seconds, or another suitable amount.

In a second stage 14, the models are undertaken or, in other words, the NOx and NH$_3$ models, more precisely the NOx conversion and the NH$_3$ slip behavior, are created. At 15, the models are set up and/or adapted. At 16 the estimates for NOx and NH$_3$ downstream of the catalytic converter 3 NOxPostEstV and NH$_3$PostEstV, for example, are determined in accordance with the following algorithms. The determination of the estimates can be considered as part of setting up the models.

A 0D CSTR (continuous stirred-tank reactor) model with first order kinetics is used here for the NOx modeling:

$$NOxPostEstV = \frac{NOxPreV}{1 + \frac{k_R}{ExhFlowV}}$$

The signals can be either scalar (a sample or sampling) or vectoral (time window with element-type operation). The coefficient of the reaction rate ($k_R$) is assumed to be constant for the time window. The optimal coefficient of the reaction rate can be determined analytically using the least squares reduction method:

$$\varepsilon = \left( \begin{bmatrix} \frac{1}{ExhFlow_1} \\ \frac{1}{ExhFlow_2} \\ \vdots \\ \frac{1}{ExhFlow_N} \end{bmatrix} k_R - \begin{bmatrix} \frac{NOxPre_1}{NOxPost_1} \\ \frac{NOxPre_2}{NOxPost_2} \\ \vdots \\ \frac{NOxPre_N}{NOxPost_N} \end{bmatrix} + 1 \right) = (\theta k_R - y)$$

in which $$\theta = \begin{bmatrix} \frac{1}{ExhFlow_1} \\ \frac{1}{ExhFlow_2} \\ \vdots \\ \frac{1}{ExhFlow_N} \end{bmatrix}, y = 1 - \begin{bmatrix} \frac{NOxPre_1}{NOxPost_1} \\ \frac{NOxPre_2}{NOxPost_2} \\ \vdots \\ \frac{NOxPre_N}{NOxPost_N} \end{bmatrix}$$

The optimization criterion min ($\epsilon^T \epsilon$) leads to:

$$k_R = (\theta^T \theta)^{-1} \theta^T y$$

The modeling of the $NH_3$ slip or of the $NH_3$ slip behavior is performed with the aid of a linear-time algorithm:

$$NH_3 PostEstV = an + b$$

a and b being constants to be adapted, and n being the number of the samples from 0 up to the time horizon −1.

a and b are calculated by minimizing the least squares criterion, as in the case of the NOx model:

$$\varepsilon = \left( \begin{bmatrix} 0 & 1 \\ 1 & 1 \\ 2 & 1 \\ \vdots \\ N-1 & 1 \end{bmatrix} \begin{bmatrix} a \\ b \end{bmatrix} - \begin{bmatrix} NOxPost_1 \\ NOxPost_2 \\ NOxPost_3 \\ \vdots \\ NOxPost_N \end{bmatrix} \right) = \left( \theta \begin{bmatrix} a \\ b \end{bmatrix} - y \right)$$

in which $$\theta = \begin{bmatrix} 0 & 1 \\ 1 & 1 \\ 2 & 1 \\ \vdots \\ N-1 & 1 \end{bmatrix}, y = \begin{bmatrix} NOxPost_1 \\ NOxPost_2 \\ NOxPost_3 \\ \vdots \\ NOxPost_N \end{bmatrix}$$

The optimization criterion min ($\epsilon^T \epsilon$) leads to:

$$\begin{bmatrix} a \\ b \end{bmatrix} = (\theta^T \theta)^{-1} \theta^T y$$

In a third stage 17, a NOx error $\epsilon_{NOx}$ of the NOx model, and an $NH_3$ error $\epsilon_{NH3}$ of the $NH_3$ model are calculated. Alternatively, it is possible to calculate an accuracy of the models. This is performed at 18 by the following formula:

$$\varepsilon_{NOx} = \sqrt{(NOxPostV - NOxPostEstV)^T (NOxPostV - NOxPostEstV)}$$
$$\varepsilon_{NH3} = \sqrt{(NOxPostV - NH_3 PostEstV)^T (NOxPostV - NH_3 PostEstV)}$$

In a fourth stage 19 it is determined whether the signals of the NOx sensor 4 are NOx or $NH_3$ values. To this end, the decision is taken, for example, by a simple comparison of the two error signals $\epsilon_{NOx}$ and $\epsilon_{NH3}$ at 20, if appropriate taking account of the temperature 21 of the catalytic converter 3. If $\epsilon_{NOx}$ is much greater than $\epsilon_{NH3}$ (or $\epsilon_{NOx}/\epsilon_{NH3}$ is greater than a defined upper threshold value or limit value, such as 1 in one example, or 1.5 in another example), the signals of the NOx sensor are determined to be $NH_3$ measured values, it thus being assumed that no NOx values are present. If $\epsilon_{NOx}/\epsilon_{NH3}$ is below a defined lower threshold or limit value, such as less than 1.5 in one example or less than or equal to 1 in another example, the signal of the NOx sensor 4 is determined to reflect NOx measured values. The upper and the lower threshold values can be either two separate values or a common value.

This switching over is performed in the filter 5. Depending on the result of what has been determined, a NOx value or an $NH_3$ value is output, making it possible to do this via an output of the filter or via two separate outputs. The filter 5 is connected into the signal chain between the NOx sensor 4 and the further processing controller (not illustrated here). The filter can also appropriately be integrated in the controller or the NOx sensor 4.

Figure 3A:
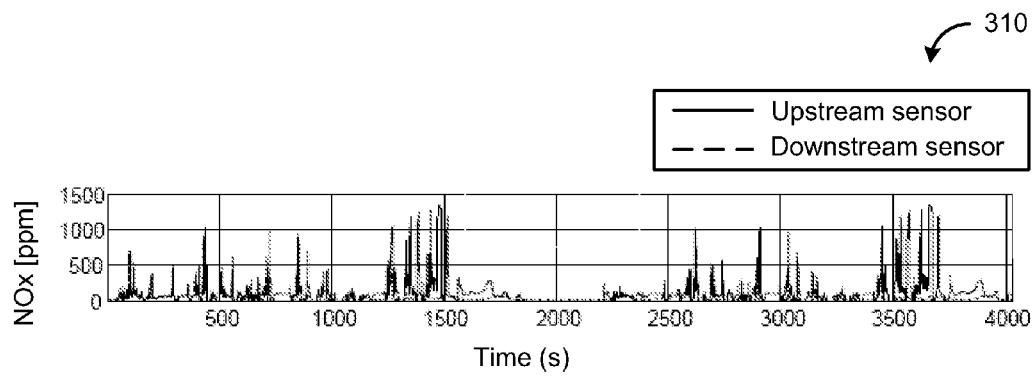
FIG. 3 shows a diagram of an application of the filtering method in accordance with the disclosure.
Figure 3B:
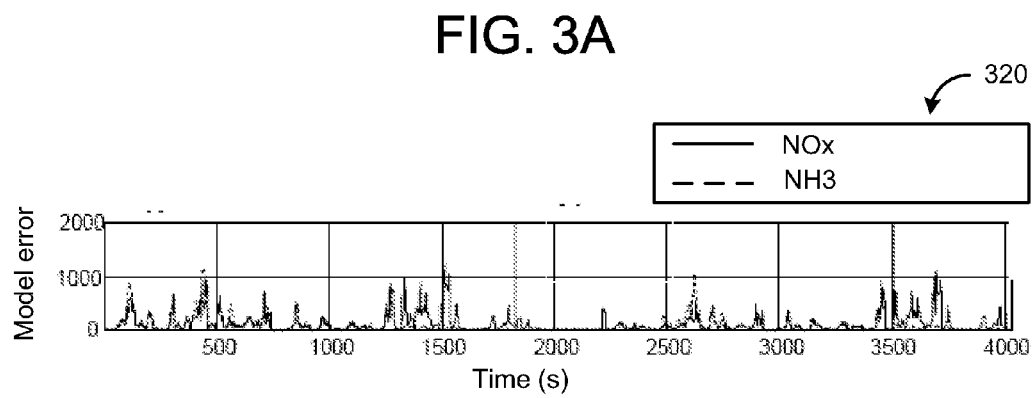

FIGS. 3A-3D show diagrams that illustrate the operation of the method of FIG. 2, of the filter 5. In FIG. 3A, diagram 310 shows the NOx values as measured by sensors upstream (solid line) and downstream (dashed line) of the catalytic converter 3. In FIG. 3B, diagram 320 shows the errors of the NOx (solid line) and $NH_3$ (dashed line) models.

Figure 3C:
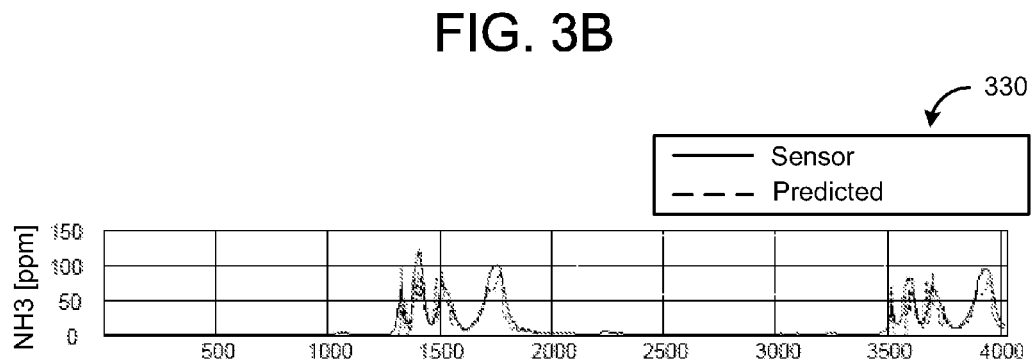

FIG. 3C depicts a diagram 330 illustrating predicted $NH_3$ values as determined by the method of FIG. 2 (dashed line) compared to $NH_3$ values measured by an $NH_3$ sensor (solid line) downstream of the catalyst.

Figure 3D:
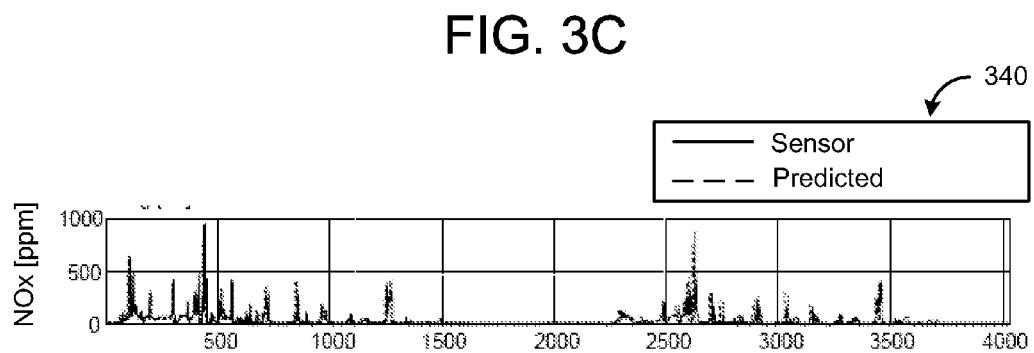

FIG. 3D depicts a diagram 340 illustrating predicted NOx values as determined by the method of FIG. 2 (dashed line) compared to NOx values measured by a NOx sensor (solid line) downstream of the catalyst.

The overlapping of the curves for both FIGS. 3C and 3D shows how well the filtering method and the filter are operating.

The method may be used in any exhaust gas system with a catalytic converter, in particular an SCR catalytic converter (passive and active). A NOx sensor is required downstream of the catalytic converter. It has been shown in practical tests that the method is very robust regarding offsets of the NOx signal upstream of the catalytic converter, and so it is possible to use both a NOx sensor and a NOx model for this value. The method requires no additional disturbances of the input NOx signal, and this can be achieved, for example, by switching the exhaust gas recirculation on and off. However, in order to validate the model or otherwise determine the accuracy of the model, NOx values may be purposely perturbed by adjusting an EGR amount and determining if the model accurately reflects the change in NOx values.

It may be said in summary that the method can be described as the comparison of the errors of two models that are based on NOx data upstream of the catalytic converter, and the signals of the NOx sensor downstream of the catalytic converter at each sampling point (typically one second) with a temporal review via a time window of typically twenty seconds.

Figure 4:
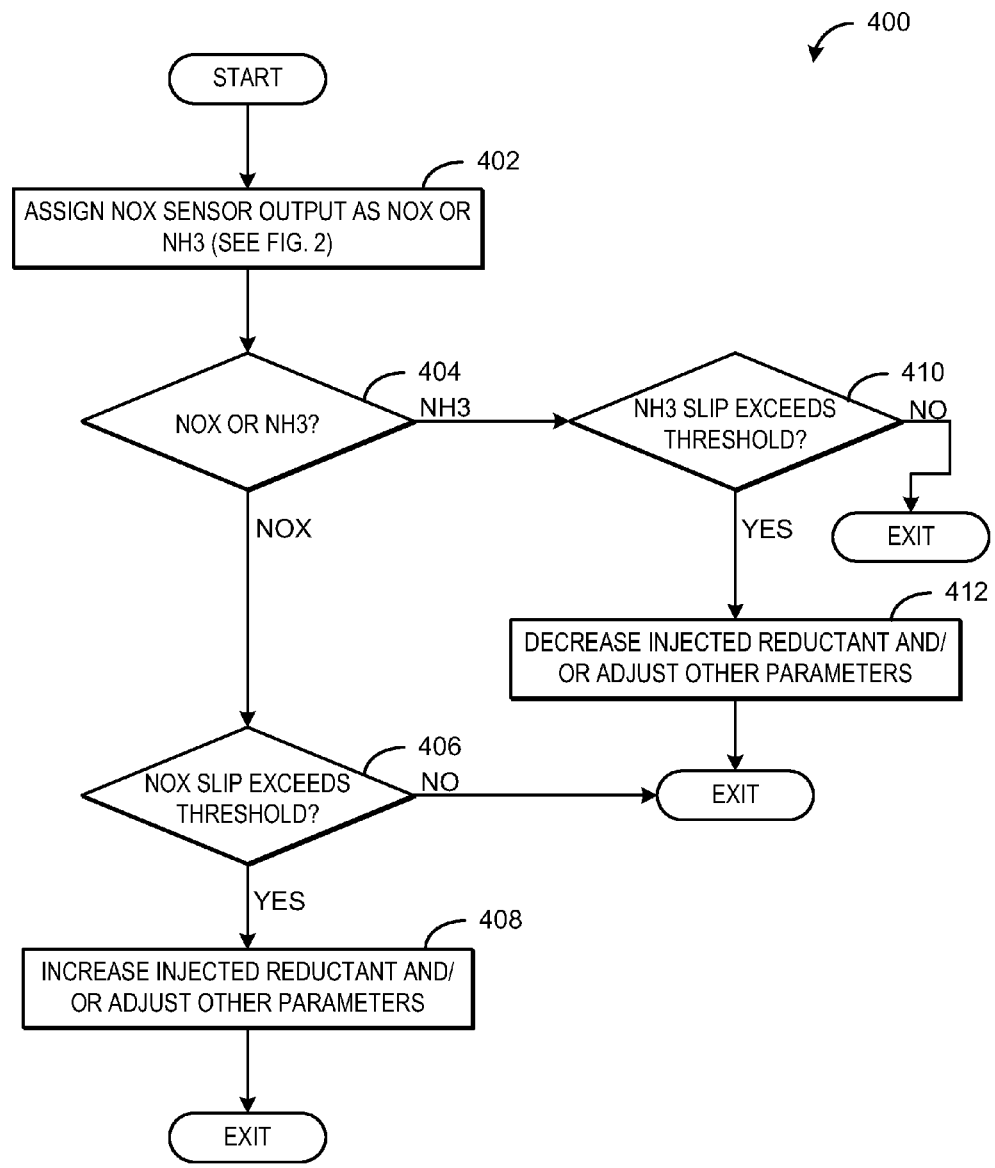
FIG. 4 is a flow chart illustrating a method for adjusting operating parameters in response to detected slip past an SCR catalyst according to an embodiment of the present disclosure.

Turning to FIG. 4, a method 400 for adjusting operating parameters in response to detected slip past an SCR catalyst is illustrated. Method 400 may be carried out by a controller of the engine following determination of whether the NOx values output by a downstream NOx sensor, such as sensor 4, reflect NOx or $NH_3$ slipping past the SCR catalyst, such as catalyst 3. As such, method 400 includes, at 402, assigning the output of the downstream NOx sensor as NOx values or $NH_3$ values, which may be determined according to the method described above with respect to FIG. 2. At 404, it is determined if the sensor output reflects NOx or $NH_3$. If the values reflect NOx, method 400 proceeds to 406 to determine if the NOx slip exceeds a threshold. The threshold may be zero, such that any detected NOx constitutes NOx slip. However, in other embodiments, the threshold may be greater than zero. In some embodiments, the threshold may be a percentage of NOx upstream of the catalyst. For example, the threshold may be 5% of the measured upstream NOx. If the amount of NOx measured by the downstream sensor does not exceed the threshold, method 400 ends. If the amount of NOx does exceed the threshold, method 400 proceeds to 408 to increase the amount of reductant supplied to the SCR catalyst. Other operating parameters may also be adjusted in response to the NOx slip, such as increasing exhaust gas recirculation to the engine, adjusting air-fuel ratio, etc.

Returning to 404, if it is determined that the sensor output reflects $NH_3$ values, method 400 proceeds to 410 to determine if the amount of $NH_3$ exceeds a threshold. The threshold may be similar to the NOx threshold described above, or it may be different. In one example, the threshold may be zero. In another example, the threshold may be greater than zero. If the amount of $NH_3$ does not exceed the threshold, method 400 ends. If the amount of $NH_3$ does exceed the threshold, method 400 proceeds to 412 to reduce the amount of supplied reductant, and/or adjust additional operating parameters.

Thus, the methods described herein provide for a method for an engine coupled to an exhaust system. The method comprises adjusting an amount of reductant supplied to a catalyst arranged in the exhaust system based on an amount of NOx and $NH_3$ slip. The NOx and $NH_3$ slip may be determined via output from a common sensor, the output assigned to only one of $NH_3$ slip and NOx slip depending on a NOx and $NH_3$ error.

The method may further comprise applying output from a NOx sensor upstream of the catalyst and output from the NOx sensor downstream of the catalyst to a NOx model and an $NH_3$ model, and calculating the NOx error from the NOx model and the $NH_3$ error from the $NH_3$ model. If a ratio of NOx model error to $NH_3$ model error exceeds a threshold, the method may include assigning the NOx sensor output from downstream of the catalyst as the amount of NOx slip, and if the amount of NOx slip is greater than zero, increasing the amount of reductant. If a ratio of NOx model error to NH3 model error is below a threshold, the method may include assigning the NOx sensor output from downstream of the catalyst as the amount of NH3 slip, and if the amount of NH3 slip is greater than zero, decreasing the amount of supplied reductant.

In another example, a method comprises if NOx slip past an SCR catalyst exceeds a first threshold, increasing an amount of reductant supplied to the SCR catalyst, and if $NH_3$ slip past the SCR catalyst exceeds a second threshold, decreasing the amount of reductant supplied to the SCR catalyst, the NOx slip and $NH_3$ slip determined from a downstream NOx sensor and a ratio of NOx model error to $NH_3$ model error.

The method may further comprise estimating a downstream NOx value by applying a set of measured upstream NOx values, measured downstream NOx values, and exhaust mass flow values to a NOx model, and estimating a downstream NH3 value by applying the set of measured upstream NOx values, measured downstream NOx values, and exhaust mass flow values to an NH3 model. The method may further comprise determining the NOx model error by comparing the estimated downstream NOx value to a measured NOx value and determining the $NH_3$ model error by comparing the estimated downstream $NH_3$ value to the measured NOx value. The method may further comprise if the NOx model error exceeds the $NH_3$ model error by a threshold amount, assigning output from the downstream NOx sensor as the $NH_3$ slip. The method may further comprise if the $NH_3$ model error exceeds the NOx model error by a threshold amount, assigning output from the downstream NOx sensor as the NOx slip.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A filtering method for a NOx sensor of an exhaust gas system having an SCR catalytic converter, said filtering method comprising:
   determining NOx concentration upstream of the catalytic converter;

measuring NOx concentration downstream of the catalytic converter;
modeling NOx conversion;
modeling $NH_3$ slip behavior;
calculating a NOx error of the NOx modeling;
calculating an $NH_3$ error of the $NH_3$ modeling;
assigning data of the NOx sensor as $NH_3$ measured values when a ratio of the NOx error to the $NH_3$ error is greater than an upper threshold value; and
assigning data of the NOx sensor as NOx measured values when the ratio of the NOx error to the $NH_3$ error is smaller than a lower threshold value.

2. The filtering method as claimed in claim 1, wherein the NOx concentration upstream of the catalytic converter is determined by a sensor.

3. The filtering method as claimed in claim 1, wherein the NOx concentration upstream of the catalytic converter is determined by a model that determines a quantity and/or concentration of NOx produced by an engine connected upstream of the exhaust gas system.

4. The filtering method as claimed in claim 1, wherein a kinetic model of the NOx conversion is used for the modeling of the NOx conversion.

5. The filtering method as claimed in claim 1, wherein a linear-time algorithm is used for the modeling of the $NH_3$ slip behavior.

6. The filtering method as claimed in claim 1, wherein the calculations of the NOx and $NH_3$ error are executed at sampling instants with a sampling time of one second.

7. The filtering method as claimed in claim 6, wherein for the calculation of the NOx error and of the $NH_3$ error, use is made of values of temporally earlier sampling instants in a time frame of twenty seconds.

8. The filtering method as claimed in claim 1, wherein a temperature of the catalytic converter is taken into account to assign the measured values.

9. The filtering method as claimed in claim 1, wherein absolute sensor and/or error signals are taken into account for determining, modeling, calculating and/or assigning.

10. A filter for a NOx sensor of an exhaust gas system with an SCR catalytic converter, said filter having a signal input for signals of the NOx sensor, an arithmetic unit for carrying out the filtering method as claimed in claim 1 and a signal output for outputting a result of the filtering method.

\* \* \* \* \*